United States Patent
Sun et al.

(10) Patent No.: US 7,063,894 B2
(45) Date of Patent: Jun. 20, 2006

(54) ENVIRONMENTAL BARRIER COATING FOR SILICON BASED SUBSTRATES

(75) Inventors: Ellen Y. Sun, South Windsor, CT (US); Gary D. Linsey, Glastonbury, CT (US); John E. Holowczak, South Windsor, CT (US); Neil R. Baldwin, Lake Forest, CA (US); Harry E. Eaton, Woodstock, CT (US)

(73) Assignee: United Technologies Corporation, Hartford, CT (US)

( * ) Notice: Subject to any disclaimer, the term of this patent is extended or adjusted under 35 U.S.C. 154(b) by 283 days.

(21) Appl. No.: 10/444,008

(22) Filed: May 22, 2003

(65) Prior Publication Data

US 2005/0003212 A1 Jan. 6, 2005

(51) Int. Cl.
  *B32B 9/04* (2006.01)
  *F03B 3/12* (2006.01)

(52) U.S. Cl. ............... 428/446; 428/448; 428/697; 428/698; 428/699; 428/701; 428/702; 416/241 B

(58) Field of Classification Search ........... 428/446, 428/448, 697, 698, 699, 701, 702; 416/241 B
See application file for complete search history.

(56) References Cited

U.S. PATENT DOCUMENTS

| | | | | |
|---|---|---|---|---|
| 5,985,470 A | * | 11/1999 | Spitsberg et al. | 428/689 |
| 6,254,935 B1 | | 7/2001 | Eaton et al. | |
| 6,284,325 B1 | | 9/2001 | Eaton, Jr. et al. | |
| 6,296,941 B1 | * | 10/2001 | Eaton et al. | 428/446 |
| 6,296,942 B1 | | 10/2001 | Eaton, Jr. et al. | |
| 6,299,988 B1 | | 10/2001 | Wang et al. | |
| 6,312,763 B1 | * | 11/2001 | Eaton et al. | 427/452 |
| 6,352,790 B1 | | 3/2002 | Eaton et al. | |
| 6,365,288 B1 | | 4/2002 | Eaton et al. | |
| 6,410,148 B1 | | 6/2002 | Eaton, Jr. et al. | |
| 6,485,848 B1 | * | 11/2002 | Wang et al. | 428/697 |
| 6,617,036 B1 | * | 9/2003 | Eaton et al. | 428/446 |
| 6,617,037 B1 | * | 9/2003 | Sun et al. | 428/446 |
| 6,645,649 B1 | * | 11/2003 | Tanaka et al. | 428/697 |
| 6,759,151 B1 | * | 7/2004 | Lee | 428/701 |
| 2002/0025454 A1 | | 2/2002 | Wang et al. | |

FOREIGN PATENT DOCUMENTS

| | | |
|---|---|---|
| EP | 1 044 944 | 10/2000 |
| EP | 1 323 689 | 7/2003 |

OTHER PUBLICATIONS

An article entitled "Oxidation Protection Coatings for C/SiC . . . ", By Webster et al., published 1998, pp. 2345–2350.

* cited by examiner

*Primary Examiner*—Jennifer McNeil
(74) *Attorney, Agent, or Firm*—Bachman & LaPointe, P.C.

(57) ABSTRACT

An article comprises a silicon based substrate, a bond layer and a protective top layer. The top layer is selected from the group consisting of rare earth disilicates, yttrium disilicates, rare earth monosilicates, yttrium monosilicates, silica and mixtures thereof. The protective layer described above is used in combination with a bond layer provided between the protective layer and the silicon based substrate which functions as oxygen getter and includes an oxygen gettering agent. By oxygen gettering agent is meant a refractory metal oxide former which forms an oxide at operational condition of (high temperature and aqueous environment) having a melting point of greater than 1500° C. wherein the negative free energy of formation of the refractory metal oxide from the refractory metal is more than 100 Kcal/mole. Suitable oxygen gettering agents include silicon and other refractory metals. An oxygen gettering agent may also be added to the protective layer.

10 Claims, 1 Drawing Sheet

ENVIRONMENTAL BARRIER COATING FOR SILICON BASED SUBSTRATES

BACKGROUND OF THE INVENTION

The present invention is drawn to an environmental barrier coating and, more particularly, an environmental barrier coating applied to a silicon containing substrate.

Silicon based ceramics exhibit accelerated oxidation rates in high temperature, aqueous environments such as for example, the combustor and turbine sections of gas turbine engines. In order to reduce the rate of oxidation on silicon based substrates used as ceramic components in such environments, significant effort has been given to providing environment barrier coating, i.e., barrier layer(s), for the silicon based substrates so as to increase the service life of such component parts.

With reference to FIGS. 1a and 1b, prior art environmental barrier coatings form a composite 10 comprising a silicon based substrate 12, an optional bond coat or layer 14 such as a dense continuous layer of silicon metal, a barrier layer 16 such as either an alkaline earth aluminosilicate based on barium and strontium, or yttrium silicate, and an optional top layer such as a refractory oxide and/or silicate layer 18 or other metal oxide such as for example zirconium oxide. In addition, an intermediate layer 20 may be provided between the 14 bond coat and the barrier 16 and/or between the barrier layer 16 and the top layer 18. The intermediate layer comprises, for example, a mixture of the barrier layer material with an additional oxide such as mullite. These prior art environmental barrier systems have proved for many silicon based substrates to be protective with respect to oxidation of the silicon based substrate and, in addition, are adherent. However, it has now been found that certain mechanical properties of some silicon containing substrates especially those substrates having coefficient of thermal expansion's (CTE's) less than silicon and those which are brittle such as silicon nitride suffer a significant reduction in 4-point bend strength at room temperature. Additionally, prior art environmental barrier coating designs especially for brittle silicon containing substrates having CTE's less than silicon such as silicon nitride do not provide an oxygen gettering agent to eliminate oxidation of the substrate.

Naturally, it would be highly desirable to provide environmental barrier coatings for silicon containing substrates such as silicon nitride which do not result in significant loss of mechanical properties and which provide enhanced oxidation protection.

Accordingly, this is a principal object of the present invention to provide an environmental barrier coating (EBC) comprising a bond layer in combination with a protection layer which is superior to EBC's of the prior art.

SUMMARY OF THE INVENTION

The foregoing object is achieved by the present invention wherein an article comprises a silicon based substrate, a bond layer and a protective top layer. In accordance with the present invention, the top layer is selected from the group consisting of rare earth disilicates, yttrium disilicates, rare earth monosilicates, yttrium monosilicates, silica and mixtures thereof. In accordance with the present invention, the protective layer described above is used in combination with a bond coat layer provided between the protective layer and the silicon based substrate which functions as oxygen getter and includes an oxygen gettering agent. By oxygen gettering agent is meant a refractory metal oxide former which forms an oxide at operational condition of (high temperature and aqueous environment) having a melting point of greater than 1500° C. wherein the negative free energy of formation of the refractory metal oxide from the refractory metal is more than 100 Kcal/mole. Suitable oxygen gettering agents include silicon and other refractory metals. An oxygen gettering agent may also be added to the protective layer. The article of the present invention comprising the oxygen gettering bond coat and protective layer offers benefits that heretofore were not obtainable by the prior art.

Further objects and advantages will appear hereinbelow.

DETAILED DESCRIPTION

Figure 1A:
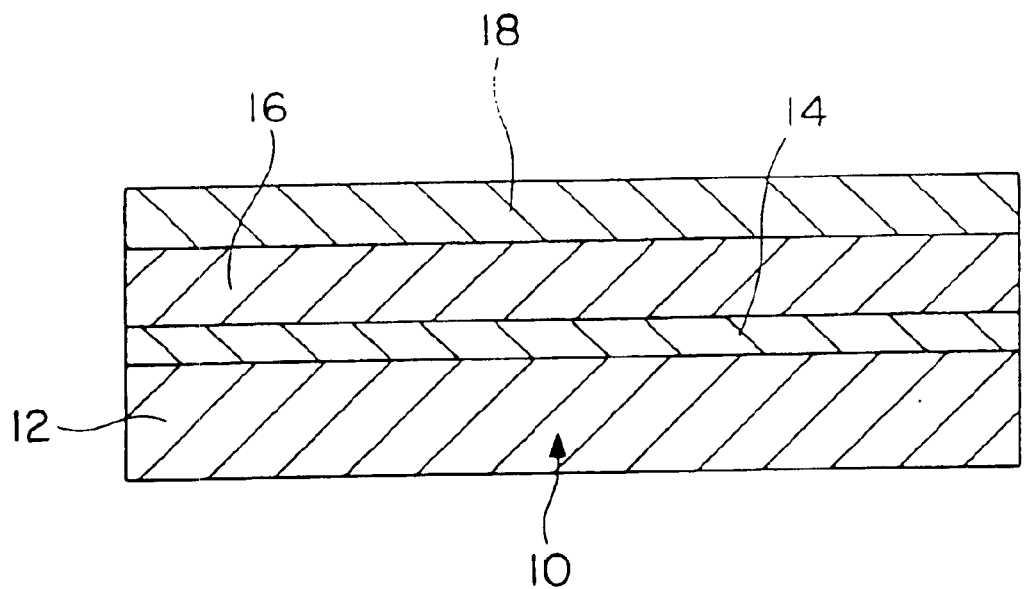
FIGS. 1a and 1b are schematic illustrations of composite articles in accordance with the prior art.
Figure 1B:
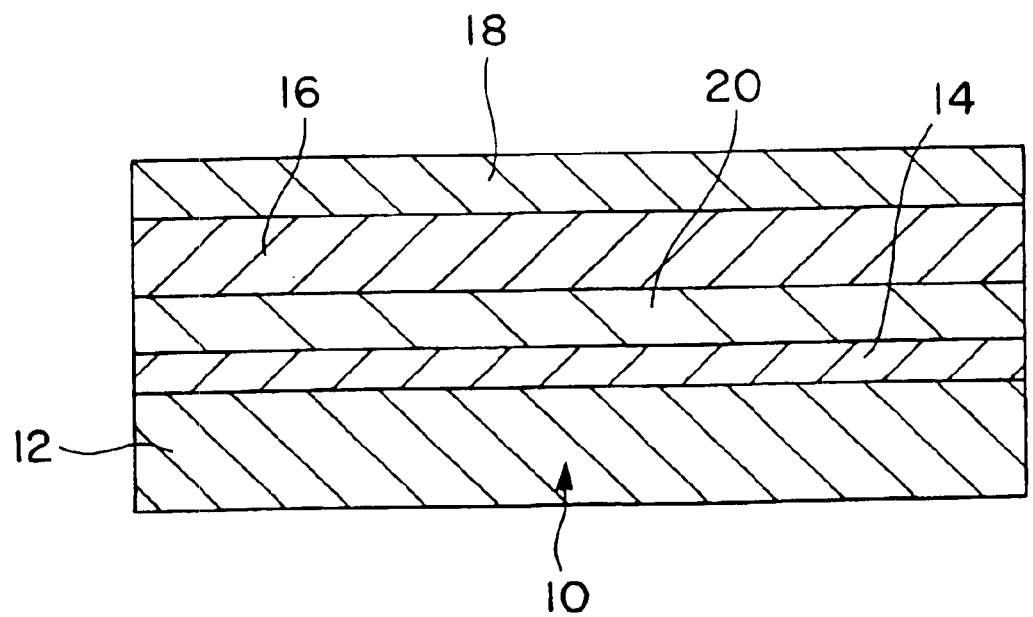

The present invention relates to an article comprising a silicon based substrate, a bond layer and a protective layer. The bond layer may be applied directly on the silicon based substrate or, alternatively, a silicon oxide intermediate layer or other intermediate layer may be provided between the bond layer and the silicon based substrate. In addition, the protective layer may be applied directly to the bond layer or, alternatively, an intermediate layer may be provided between the bond layer and the protective layer.

The silicon containing substrate may be a silicon ceramic substrate or a silicon containing metal alloy. In a preferred embodiment, the silicon containing substrate is a silicon containing ceramic material such as, for example, silicon carbide, silicon carbide composite, silicon nitride, silicon nitride composite, silicon oxynitride and silicon aluminum oxynitride.

In accordance with the present invention, the protective layer used in the article of the present invention is selected from the group consisting of rare earth disilicates, yttrium disilicates, rare earth monosilicates, yttrium monosilicates, silica and mixtures thereof. It has been found that a silicon Protective layer selected from the group consisting of yttrium disilicate, lutetium disilicate, erbium disilicate, lanthanum disilicate, yttrium disilicate and mixtures thereof is particularly useful. Particularly useful monosilicates are selected from the group consisting of silicates of yttrium, lanthanum, ytterbium, lutetium, erbium and mixtures thereof. Combination of the disilicates and monosilicates are set forth above and combination of disilicates and/or silicates with silicon are particularly useful. An oxygen gettering agent as described above may be added to the protective layer.

In accordance with the present invention, the protective layer described above is used in combination with a bond layer, which functions as an oxygen getter, provided between the silicon based substrate and the protective layer. A particularly suitable bond layer for use in the present invention is described in co-pending application Ser. No. 10/443,321 and comprises a first phase and a second phase wherein the first phase is selected from the group consisting of refractory metal oxides, refractory metal silicates and mixtures thereof and the second phase is selected from the group consisting of refractory metal oxide forming metals, silicon carbide, silicon nitride, and mixtures thereof. Preferably, the first phase is selected from the group consisting of oxides of chromium, silicon, tantalum, titanium, niobium, hafnium, yttrium, aluminum, zirconium, rare earth metals, alkaline earth metals; silicates of chromium, silicon, tantalum, titanium, niobium, hafnium, yttrium, aluminum, zirconium, rare earth metals, alkaline earth metals; and mixtures thereof. The second phase is preferably selected from chromium, silicon, tantalum, niobium, hafnium, yttrium, aluminum, zirconium, titanium, rare earth metals, alkaline earth metals and mixtures thereof. Niobium oxide, hafnium oxide and mixtures thereof is particularly useful as the first phase. In addition, it has been found that silicon metal is particularly useful as the second phase refractory metal oxide forming metal. Co-pending application Ser. No. 10/443,321 is incorporated herein by reference.

A further suitable bond layer for use in the article of the present invention is disclosed in co-pending application Ser. No. 10/443,342 filed concurrently herewith and incorporated herein by reference. The bond layer comprises an alloy comprising a refractory metal disilicide/silicon eutectic. The eutectic has a melting point of greater than 1300° C. and a fracture toughness of greater than 1 MPa·m$^{1/2}$. The bond layer may comprise a multiphase microstructure of the aft of said eutectic in combination with one of the refractory metal disilicide and silicon. Particularly useful refractory metals for use in the bond layer are selected from the group consisting of molybdenum, chromium, hafnium, niobium, rhenium, tantalum, titanium, tungsten, uranium, vanadium, yttrium and mixtures thereof. The silicon is present in the bond layer in an amount of greater than or equal to 66.7 atomic percent.

Further suitable bond layers are disclosed in co-pending applications Ser. No. 10/443,341 and Ser. No. 10/443,343. Co-pending application Ser. No. 10/443,341 discloses a bond layer which comprises a silicon layer having a dispersion of particulate material therein wherein the particulate material is selected from the group consisting of (1) alumina, (2) yttria, (3) aluminum silicate, (4) compounds of rare earth elements, alkaline earth elements, aluminum, oxygen, yttrium, nitrogen, carbon, and mixtures thereof. Co-pending application Ser. No. 10/443,341 is incorporated herein by reference. Co-pending application Ser. No. 10/443,343, which is incorporated herein by reference, discloses a bond layer in combination with a further layer on the bond layer wherein the bond layer comprises a silicon layer having a dispersion of fibers wherein at least some of the fibers extend between the bond layer and the further layer, wherein the fibers are formed of a material selected from the group consisting of (1) alumina, (2) yttria, (3) aluminum silicate, (4) silicon carbide, (5) silicon nitride, (6) compounds of rare earth elements, alkaline earth elements, aluminum, silicon, niobium, tantalum, hafnium, oxygen, yttrium, nitrogen, carbon and mixtures of (1) thru (6).

Co-pending application Ser. No. 10/443,258 which is incorporated herein by reference, discloses a bond layer for a silicon based substrate comprises a refractory oxide forming metal having a thickness of between about 0.1 to 15 micron. The refractory oxide forming metal is selected from the group consisting of chromium, tantalum, niobium, silicon, platinum, hafnium, yttrium, aluminum, zirconium, titanium, rare earth metals, alkaline earth metals and mixtures thereof.

Finally, in addition to the foregoing bond layers, pure silicon bond layers as described in U.S. Pat. No. 6,296,941 (incorporated herein by reference) are also useable in the present invention.

Intermediate layers may be provided between the bond layer and the protective layer, as for example, the further layer described above with regard to co-pending application Ser. No. 10/443,343. In addition, the intermediate layer may comprise a layer selected from the group consisting of mullite, cordierite, silimanite.

The article of the present invention offers significant improvement in oxidation resistance for the substrate and fracture toughness over the prior art environmental barrier coatings.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An article comprising a silicon based substrate, an oxygen gettering bond layer on the substrate and a protective top layer, the protective top layer comprises an oxygen gettering agent and a constituent selected from the group consisting of rare earth disilicates, yttrium disilicates, rare earth monosilicates, and mixtures thereof.

2. An article according to claim 1, wherein the protective layer is selected from the group consisting of yttrium disilicate, lutetium disilicate, erbium disilicate, lanthanum disilicate, and mixtures thereof.

3. An article according to claim 1, wherein the protective layer is selected from the group consisting of the disilicates in combination with the monosilicates.

4. An article according to claim 1, wherein the protective layer is selected from the group consisting of the disilicates in combination with silicon.

5. An article according to claim 1, wherein the monosilicates are selected from the group consisting of silicates of lanthanum, ytterbium, lutetium, erbium and mixtures thereof.

6. An article according to claims 1, 2, 3, 4 or 5, wherein the bond layer is selected from the group consisting of:
  (a) pure silicon;
  (b) a bond layer comprising two phases wherein the first phase is selected from the group consisting of refractory metal oxides, refractory metal silicates and mixtures thereof and the second phase is selected from the group consisting of refractory metal oxide forming metals, silicon carbide, silicon nitride, and mixtures thereof;
  (c) a bond layer which comprises an alloy comprising a refractory metal disilicide/silicon eutectic;
  (d) a bond layer which comprises a silicon layer having a dispersion of particulate material therein, wherein the particulate material is selected from the group consisting of (1) alumina, (2) yttria, (3) aluminum silicate, (4) compounds of rare earth elements, alkaline earth elements, aluminum, oxygen, yttrium, nitrogen, carbon, and mixtures thereof;
  (e) a bond layer which comprises a silicon metal containing layer having a dispersion of fibers wherein at least some of the fibers extend between the bond layer and the further layer, wherein the fibers are formed of a material selected from the group consisting of (1) alumina, (2) yttria, (3) aluminum silicate, (4) silicon carbide, (5) silicon nitride, (6) compounds of rare earth elements, alkaline earth elements, aluminum, silicon, niobium, tantalum, hafnium, oxygen, yttrium, nitrogen, carbon and mixtures of (1) thru (6); and
  (f) a bond layer which comprises a metal refractory oxide having a thickness of between 0.1 to 15 microns, wherein the refractory metal oxide is selected from the group consisting of oxides of chromium, tantalum, niobium, silicon and mixtures thereof.

7. An article according to claim 1, wherein at least one intermediate layer is provided between the bond layer and the protective layer.

8. An article according to claim 7, wherein the intermediate layer is selected from the group consisting of silicon oxide, mullite, cordierite, sillimanite, and mixtures thereof.

9. An article according to claim 1, wherein the silicon substrate is a silicon nitride substrate.

10. An article according to claim 1, wherein the top layer further includes yttrium monosilicates.

* * * * *